United States Patent
Springer

(10) Patent No.: US 12,452,497 B2
(45) Date of Patent: Oct. 21, 2025

(54) DYNAMICALLY USER-CONFIGURABLE INTERFACE FOR A COMMUNICATION SESSION

(71) Applicant: Zoom Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 9 days.

(21) Appl. No.: 17/733,960

(22) Filed: Apr. 29, 2022

(65) Prior Publication Data
US 2023/0353835 A1    Nov. 2, 2023

(51) Int. Cl.
| | |
|---|---|
| *G06F 3/048* | (2013.01) |
| *G06F 3/00* | (2006.01) |
| *G06F 3/0481* | (2022.01) |
| *H04N 21/2187* | (2011.01) |
| *H04N 21/431* | (2011.01) |
| *H04N 21/485* | (2011.01) |

(52) U.S. Cl.
CPC .......... *H04N 21/4858* (2013.01); *G06F 3/00* (2013.01); *G06F 3/0481* (2013.01); *H04N 21/2187* (2013.01); *H04N 21/4314* (2013.01); *G09G 2340/0407* (2013.01)

(58) Field of Classification Search
CPC .......... H04N 21/4858; H04N 21/2187; H04N 21/4314; G06F 3/00; G06F 3/0481; G09G 2340/0407
See application file for complete search history.

(56) References Cited

U.S. PATENT DOCUMENTS

| | | | |
|---|---|---|---|
| 2010/0002069 A1* | 1/2010 | Eleftheriadis | H04N 21/654 348/14.08 |
| 2011/0175930 A1* | 7/2011 | Hwang | G06F 3/04886 345/660 |
| 2014/0168277 A1* | 6/2014 | Ashley | G06F 3/1446 345/672 |
| 2020/0145620 A1* | 5/2020 | Alcantara | G08B 13/19693 |
| 2020/0371677 A1* | 11/2020 | Faulkner | G06F 3/14 |
| 2021/0400093 A1* | 12/2021 | Ashkenazi | H04N 7/147 |
| 2022/0188132 A1* | 6/2022 | Yue | G06F 3/04812 |
| 2022/0247940 A1* | 8/2022 | Springer | H04N 21/2187 |
| 2023/0216898 A1* | 7/2023 | Pokharel | H04L 65/4015 709/217 |

* cited by examiner

*Primary Examiner* — Aleksey Olshannikov
(74) *Attorney, Agent, or Firm* — Young Basile Hanlon & MacFarlane, P.C.

(57) ABSTRACT

Methods and systems provide a dynamically user-configurable interface for a communication session. In one embodiment, a system presents, at a client device connected to a communication session, a user interface ("UI"), the UI including a canvas section with one or more canvas assets and an asset selector section with one or more selector components representing canvas assets. The system receives a request to place a chosen selector component from the asset selector section into a specified location in the canvas section. In response to the request, the system identifies a type and size properties of the canvas assets and size properties of the canvas section; determines a size for the chosen selector component; and presents the chosen selector component within the specified location in the canvas section at the determined size while concurrently recompositing the canvas assets.

20 Claims, 10 Drawing Sheets

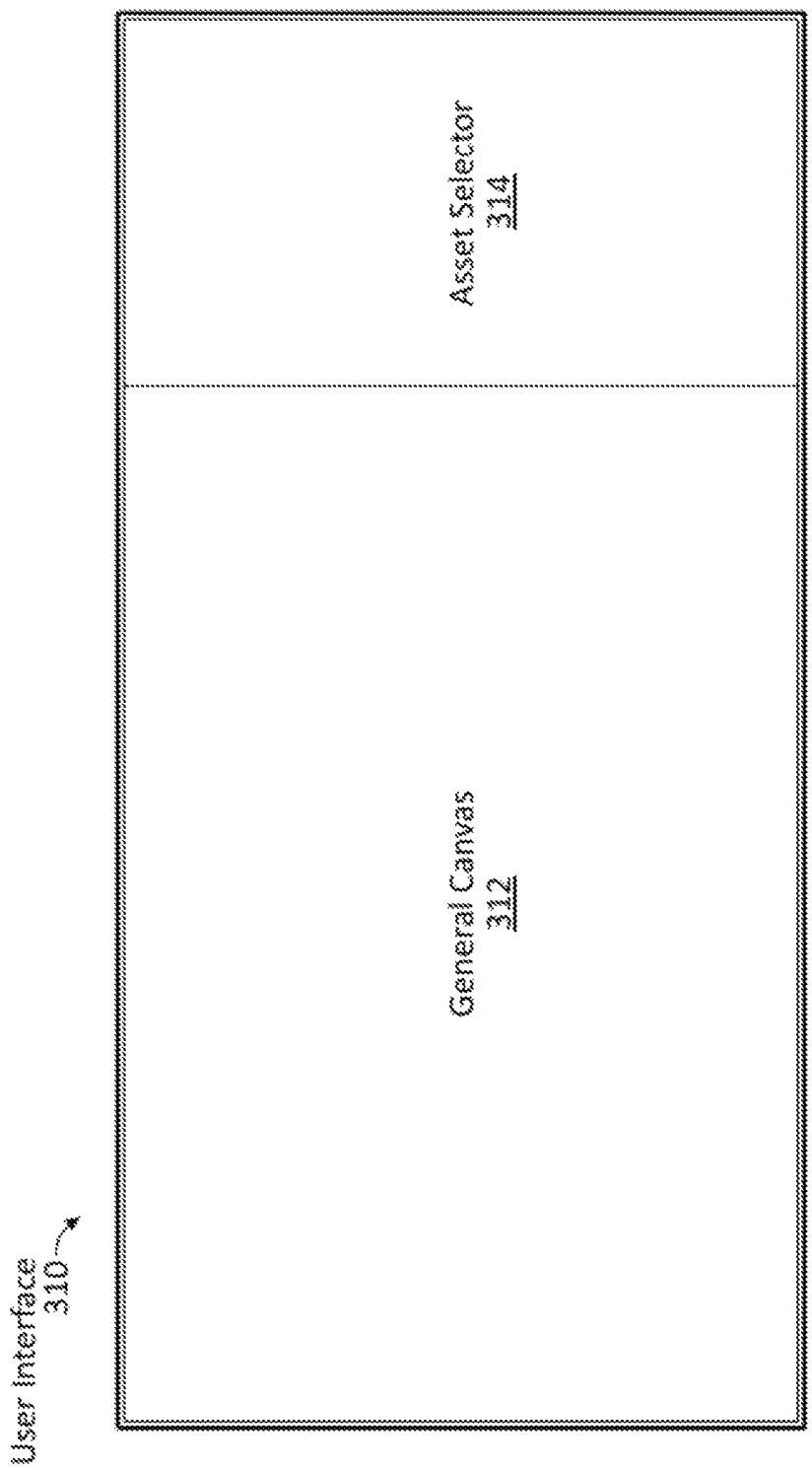

DYNAMICALLY USER-CONFIGURABLE INTERFACE FOR A COMMUNICATION SESSION

FIELD

The present application relates generally to digital communication, and more particularly, to systems and methods for providing a dynamically user-configurable interface for a communication session.

SUMMARY

The appended claims may serve as a summary of this application.

BRIEF DESCRIPTION OF THE DRAWINGS

The present application relates generally to digital communication, and more particularly, to systems and methods providing for a dynamically user-configurable interface for a communication session.

The present disclosure will become better understood from the detailed description and the drawings, wherein:

FIG. 3A is a diagram illustrating one example embodiment of a layout for a dynamically user-configurable interface (hereinafter "UI") for a communication session, according to some embodiments.

DETAILED DESCRIPTION OF THE DRAWINGS

Figure 1A:
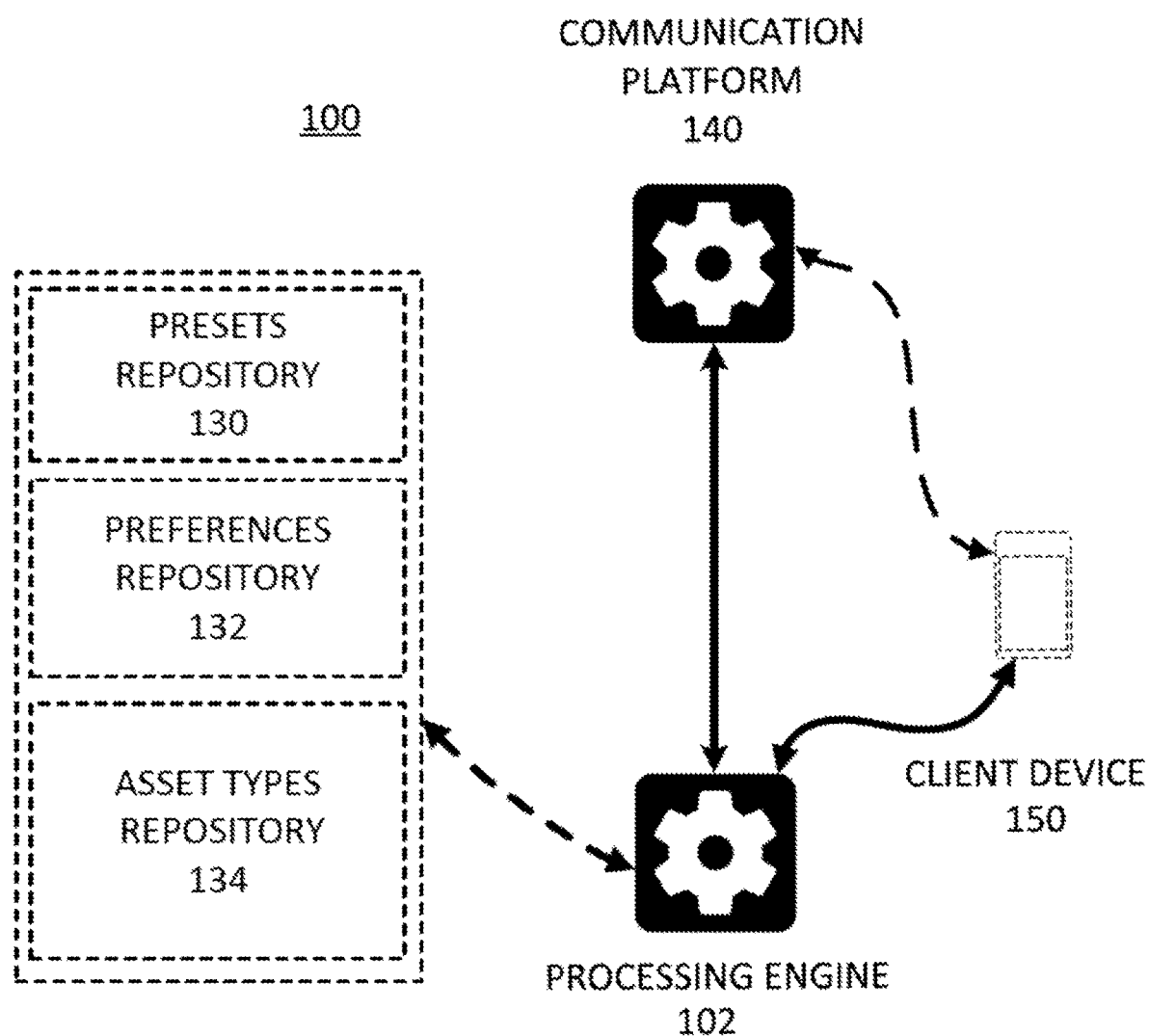
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session within a communication platform, such as a remote video presentation, participants may typically see a user interface ("UP") with a number of UI components, such as participant windows, video streams, presentation slides, a shared desktop, or similar. Currently, users have little control over how the interface is presented to them, and which UI components may be seen within the UI. A platform may typically be configured to present one view out of a small number of available views, such as an "active speaker view" (i.e., where the video feed of the currently active speaker is presented, and no other video feeds are presented) or "gallery view" (i.e., where all or many video feeds of participants are displayed simultaneously within the UI). However, a user may wish to configure the UI based on their preferences or needs. Often, a user may be missing items or seeing too much of others. For example, a user may wish to always see a view of his or her company CEO to see their reaction to new information being presented, even though the CEO is not speaking. In some platforms, this CEO may be "pinned" or spotlighted to be seen in the view, but the user still may be unable to, for example, resize the CEO's video feed to the user's preferences, or configure their settings so that every meeting their CEO attends should have a UI which shows the CEO.

In addition, when a user wishes to add a new component, other components must be dynamically resized in real time. For example, components may be cropped or shrunk, or the position of the component might change within the UI. It takes a significant amount of processing and transcoding to ensure an acceptable print resolution for a UI component of variable size, which presents challenges to implementing the dynamic resizing of components. It is also desirable that components are dynamically resized such that each component has enough real estate that its contents can be viewed legibly by the participant, which is also a challenge that current implementations do not account for.

Thus, there is a need in the field of digital communication tools and platforms to create new and useful systems and methods for providing a dynamically user-configurable interface for a communication session. The source of the problem, as identified by the inventors, is a lack of real-time user configurability of UI components with dynamic resizing applied in response based on various factors.

In one embodiment, a system presents, at a client device connected to a communication session, a UI, the UI including a canvas section with one or more canvas assets, and an asset selector section with one or more selector components representing canvas assets. The system receives a request to place a chosen selector component from the asset selector section into a specified location in the canvas section, the chosen selector component being not yet presented in the canvas section. In response to the request, the system identifies a type and one or more size properties of the canvas assets in the canvas section and one or more size properties of the canvas section; determines a size for the chosen selector component based on the size properties of the canvas assets in the canvas section and the size property of the canvas section; and presents, at the client device in substantially real time upon receiving the request, the chosen selector component within the specified location in the canvas section at the determined size while concurrently recompositing the canvas assets in the canvas section.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., presets repository 130, preferences repository 132, and/or an asset types repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
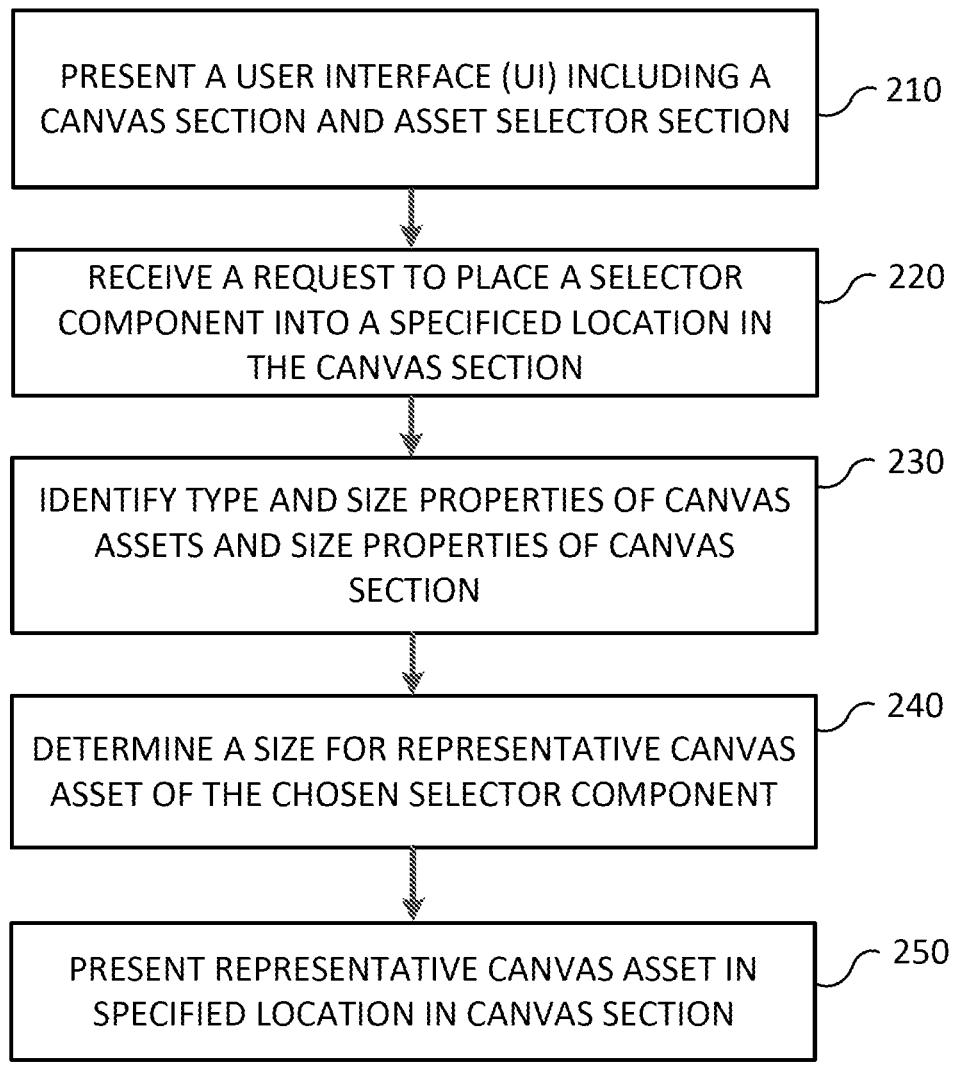
FIG. 2 is a flow chart illustrating an exemplary method that may be performed in some embodiments.

In an embodiment, the processing engine 102 may perform the exemplary method of FIG. 2 or other method herein and, as a result, provide a dynamically user-configurable UI for a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a presets repository 130, preferences repository 132, and/or an asset types repository 134. The optional repositories function to store and/or maintain, respectively, custom preset configurations for a UI; preferences of a user associated with a client device that is presented with the UI; and asset types associated with canvas assets which may be displayed within the UI. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 1B:
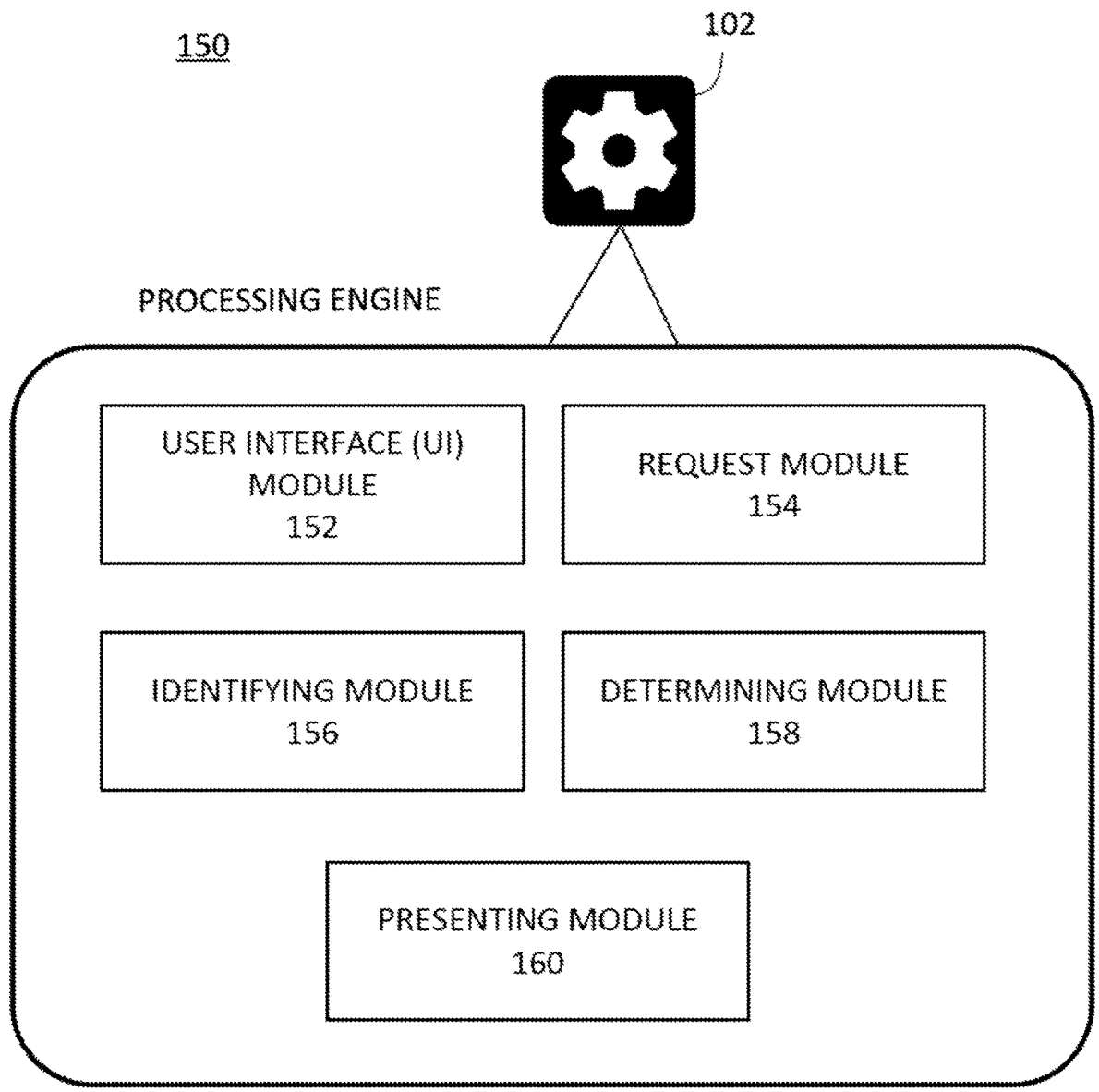
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to present, at a client device connected to a communication session, a user interface (UI), the UI including a canvas section with one or more canvas assets, and an asset selector section with one or more selector components representing canvas assets.

Request module 154 functions to receive a request to place a chosen selector component from the asset selector section into a specified location in the canvas section.

Identifying module 156 functions to identify, in response to the request, a type and one or more size properties of the canvas assets in the canvas section and one or more size properties of the canvas section.

Determining module 158 functions to determine a size for the chosen selector component based on the size properties of the canvas assets in the canvas section and the size property of the canvas section.

Presenting module 160 functions to present, at the client device in substantially real time upon receiving the request, the chosen selector component within the specified location in the canvas section at the determined size while concurrently recompositing the canvas assets in the canvas section.

The above modules and their functions will be described in further detail in relation to an exemplary method below.

FIG. 2 is a flow chart illustrating an exemplary method that may be performed in some embodiments.

At step 210, the system presents, at a client device connected to a communication session, a user interface (UI), the UI including a canvas section with one or more canvas assets, and an asset selector section with one or more selector components representing canvas assets.

In some embodiments, the system maintains a communication session with a number of participants, wherein session content is presented during the communication session to the participants, and wherein participants can request the session content to be captured for later access. The client device connected to the communication session is associated with one of the participants of the communication session.

The communication session can include session content in a number of potential ways. In some embodiments, the session content is presentation content presented by one or more presenting participants. For example, a presenter can present a number of presentation slides during the communication session. The presenter can also speak as he presents each slide, and potentially appear on video as well. In some embodiments, one or more presenters can present a prepared video while speaking. Other possibilities may include a presenter presenting a document such as a PDF or Word document, a presenter sharing his screen while talking, or a presenter drawing on a virtual whiteboard as he speaks. In some embodiments, rather than one or more presenters presenting material, the session content can include video, audio, or images from a number of participants as they discuss something, or engage in question-and-answer sessions. In some embodiments, audio and/or video streams of the one or more presenting participants can be included. In some embodiments, a portion of a transcript from the communication session can be included. This transcript may be automatically generated during the communication session, then included as session content. Many other such possibilities may be contemplated.

In some embodiments, the system maintains the communication session by connecting participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

In some embodiments, the UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the communication session, engage or interact with one or more functional elements within the communication session, control one or more aspects of the communication session, and/or configure one or more settings or preferences within the communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., send messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for muting or unmuting audio, stopping or starting video of the participant, sharing the participant's screen with other participants, recording the video session, and/or ending the video session.

In some embodiments, one or more UI elements may be a canvas section with one or more canvas assets. For example, canvas assets for video feeds of participants may be shown by default within a UI upon a client device connecting to a communication session. A single canvas asset for an active speaker may be presented instead, with the video feed being shown changing based on who is actively speaking at the time. An example of a canvas section will be discussed below with respect to FIG. 3.

In some embodiments, a canvas section represents the space allocated within the UI for elements which may be necessary or desirable for a user to be presented with during the course of communication with other participants in the session. Most of a participant's attention will therefore be focused on these visual elements, in addition to audio of speaking participants.

In some embodiments, the canvas assets represent individual components which may be seen within the canvas asset. In various embodiments, canvas assets may include one or more elements such as images, pre-recorded video, streamed video (such as live streamed video feeds of participants), applications (such as, e.g., a note-taking application, spreadsheet application, or calculator application), presentations (such as, e.g., slide deck presentations), content sharing elements (such as, e.g., a participant remotely sharing a desktop view or window view), interactive elements, and more. Any combination thereof may also be contemplated.

In some embodiments, one or more UI elements may be an asset selector section with one or more selector components. In some embodiments, the selector components represent canvas assets which may be potentially chosen by a participant to be placed within the canvas section of the UI. For example, a selector component may be a video feed of a certain user. That user may not be currently seen within a video feed canvas asset within the canvas section, but a user may place that selector component within the canvas section such that the participant can now see the user's video feed. An example of an asset selector section will be discussed below with respect to FIG. 3.

In some embodiments, the one or more canvas assets within the canvas section and the one or more selector components within the asset selector section are determined based on a pre-specified default configuration. That is, a default configuration may be configured in a settings or preferences section for the participant, or may be automatically applied without any configuration by the participant, with the default configuration showing a default set of canvas assets for the canvas section. For example, by default, the system may present the user with a UI showing the currently active speaker's video feed, a content share or slide presentation if applicable, and potentially one or two video feeds of other recently active speakers. Such a default configuration may be pre-specified as default for all users, that user, or may be adjusted dynamically based on the context and current situation of the session. For example, a system may determine whether any participant is a host or administrator of the session, and if yes, then the system will show the video feed for that participant by default.

In some embodiments, the one or more canvas assets within the canvas section and the one or more selector components within the asset selector section are determined using an artificial intelligence (AI) model trained on at least one of: historical preferences of a user associated with the client device; past behavior of the user with respect to canvas assets or selector components of the same component type; and/or past behavior of other users with respect to canvas assets or selector components of the same component type. That is, for example, a user's previous behavior, preferences, or settings may determine which canvas assets are initially displayed within the canvas section, in which positions, and at which sizes. Other users' past behaviors, preferences, or settings may also determine this initial configuration based on how they've handled canvas assets of similar types. In some embodiments, the AI model may be a machine learning ("ML") model, machine vision ("MV") model, or any other similar AI model.

In some embodiments, at least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or a virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 220, the system receives a request to place a chosen selector component from the asset selector section into a specified location in the canvas section. In some embodiments, the system receives the request from the client device. The request may take the form of a participant using the client device interactively selecting one or more UI components in such a way that a request is triggered for the system. For example, a user dragging one of the selector components from the asset selector section onto the canvas section may trigger a request to place that selector component into the location specified by the user, i.e., where the user stopped dragging within the canvas section. In other embodiments, a user may select a button or UI component labeled as a way to edit the canvas section, or may click an icon visually indicating that a lock may be unlocked, then select one or more options for selector components being added to the canvas section. In some embodiments, one or more canvas assets in the canvas section may be dragged to the selector component to remove them, dragged out of the UI, or otherwise be interacted with in such a way that the user indicates a request to remove the canvas assets from the canvas section.

In some embodiments, the request further includes one or more additional chosen selector components, the chosen selector component and the additional chosen selector components being presented as composited layers within the single chosen selector component. For example, the user may choose a video feed as one selector component, and a slide presentation as another, indicating a request to composite the two components so that the video feed appears overlaid on top of the slide presentation. In such a way, two or more components may be combined into a single canvas asset with some elements overlaid on top of others.

In some embodiments, the request further includes one or more chosen canvas assets from the one or more canvas assets in the canvas section, the chosen selector component and the chosen canvas assets being presented as composited layers within the single chosen selector component. This may include, for example, a user selecting multiple canvas assets within the canvas section within an intention to overlay one canvas asset on top of another.

In some embodiments, prior to receiving the request, the system displays one or more "candidate spaces" for regions of the canvas section which are not yet occupied by canvas assets. Such a candidate space may be represented by, e.g., a rectangle or square with dashed lines for a border. A candidate space may indicate that an area of the canvas section is currently available to be filled with one or more canvas assets as chosen within the asset selector section.

At step 230, the system identifies, in response to the request, a type and one or more size properties of the canvas assets in the canvas section and one or more size properties of the canvas section. A type of a canvas asset may be, e.g., a video feed, content share, slide presentation, pre-recorded video playback, an application, or any other suitable component type. Size properties of the canvas section and/or canvas assets may include, e.g., resolution, print resolution, number of pixels, percentage of canvas section size, dimensions, or any other suitable size properties.

In some embodiments, the one or more size properties of the canvas assets and/or the one or more size properties of the canvas section include print resolutions. Print resolution may be measured in, for example, dots per inch ("DPI"), where the number of pixels printed to the display per inch for that component are measured. In some embodiments, determining the size for the chosen selector component includes determining a print resolution for the chosen selector component, with the chosen selector component configured to be presented at the determined print resolution. This print resolution may factor in the legibility of the content of canvas assets, or may estimate a print resolution based on the type of the canvas asset in question. In some embodiments, the system later, in step 250, recomposites the canvas assets in the canvas section by determining new print resolutions for the canvas assets and adjusting the canvas assets to the new print resolutions. In some embodiments, an "optimal" print resolution may be determined, where optimal print resolution refers to the largest size the print resolution can be while still displaying all other canvas assets that need to be displayed in a visible or legible manner for the participant, i.e., with all contents at a minimally acceptable visibility or legibility.

In some embodiments, the system presents, at the client device, a notification that the chosen selector component cannot be placed at the specified location or that the content of the chosen selector component cannot be displayed at a minimum threshold of legibility. For example, in some cases, the user is requested to place a canvas asset in a location where other canvas assets cannot be recomposited without the legibility of their associated content not meeting a standard of minimum legibility, given the resolution of the client device display, one or more user settings or preferences, and/or other factors.

In some embodiments, the system determines one or more types of the canvas assets based on identifying the type of content to be shown in the canvas asset upon placement. In some embodiments, this identification of the type of content to be shown in the canvas asset is performed via one or more AI techniques, such as ML or MV techniques. In one example, the system may identify that the type of content for a canvas asset is a spreadsheet. The system may further identify size properties for this type based on what may be considered a minimally acceptable level of legibility.

In some embodiments, the size properties for the canvas assets in the canvas section and the chosen selector component are determined according to one or more grid-based recompositing options to be applied to the canvas section. For example, the rule of thirds may be applied as a grid-based recompositing option, where a 3×3 grid is overlaid by the system on the canvas section, and each of the canvas assets must be placed by the system within the grid lines of a particular grid section. Sizes of canvas assets must therefore conform to the grid layout, and must also be recomposited accordingly in step 250.

At step 240, the system determines a size for the chosen selector component based on the size properties of the canvas assets in the canvas section and the size property of the canvas section. In some embodiments, the size for the chosen selector component may be determined as an ideal or optimal size for the chosen selector component within the canvas section, given the other canvas assets within the canvas section. If the canvas section is already crowded with several canvas assets, for example, then the determined size may be relatively small to account for a lack of space, although not so small that a participant cannot legibly view the contents of the canvas asset. Various factors may go into such a determination, including, e.g., the size properties of the canvas assets and canvas section, the resolution of the display of the client device, the type of the chosen selector component and/or other canvas assets in the canvas section, content of the chosen selector component and/or other canvas assets in the canvas section, and potentially more.

In some embodiments, one or more AI techniques may be used for determining the size of the chosen selector component, such as, e.g., ML or MV techniques. One or more AI models may be used. The AI models may be trained on one or more datasets, such as, e.g., the previous behavior or preferences of the user or other users, other configurations chosen for users or selected by users for various types of assets, and more.

At step 250, the system presents, at the client device in substantially real time upon receiving the request, the chosen selector component within the specified location in the canvas section at the determined size while concurrently recompositing the canvas assets in the canvas section. Recompositing refers to the process of updating the UI and its components as a result of a state or data change, which in this case is a user request to place a chosen selector component in the canvas section. Recompositing of the canvas assets may include, e.g., repositioning the canvas assets, resizing them, cropping them, or otherwise adjusting their presentation so that the chosen selector component can fit legibly within the canvas section.

In some embodiments, recompositing the canvas assets is based on one or more of: identified component types of each of the canvas assets, one or more active or recently active speakers associated with canvas assets, and one or more active content shares associated with canvas assets. For example, the type of canvas asset may factor in determining how to recomposite a canvas asset. If a canvas asset is a slide presentation with tiny text, then the system may determine that it should not be shrunk too much to fit in the chosen selector component. Other assets may shrink more to accommodate for this asset not shrinking as much, for example. Thus, in some embodiments, any one canvas asset may be recomposited in relation to other canvas assets and their requirements or limitations for recompositing. The system may require processing, recalculation, transcoding, additional resolution determinations, or more to factor in all conditions and recomposite each canvas asset appropriately such that the new asset can be placed within the canvas section.

In some embodiments, at least one of the canvas assets in the canvas section is replaced with the chosen selector component. In some embodiments, a user may drag and drop a selector component onto a canvas asset in the canvas section, and in response, the system may replace that canvas asset with the chosen selector component for that selector component. That is, a user may request to perform a replacement of one canvas asset for another. In such a case, the system may resize the chosen selector component for legibility, then recomposite other canvas assets to accommodate the resizing, or may not perform any recompositing at all if no resizing is necessary.

In some embodiments, the system receives information about the borders of the content within each of the canvas assets, and then crops each of the canvas assets up to the borders of the content so that the content is still visible within the UI. The information about the borders of the content may include, for example, the boundaries, dimensions, or edges of content within the canvas asset, such that cropping any portion outside of those boundaries would not result in the loss of content for the viewing participant. In some embodiments, recompositing may occur by cropping to a "safe zone" which lies around the edge of the content. In some embodiments, the safe zone may demarcate content which anyone can see, or demarcate content which only those with high resolution displays may see, or any other suitable demarcation for different client devices or displays.

In some embodiments, recompositing the canvas assets in the canvas section includes grouping one or more of the canvas assets into a single grouped canvas asset containing a number of canvas assets. For example, a user may wish to place one canvas asset into a group of canvas assets which are configured to be displayed within the frames of that group asset. In this way, users may be able to organize and place assets within a larger container as their preferences or needs dictate.

In some embodiments, one or more UI components may be configured to save the canvas configuration to a custom preset configuration that is retrievable at a later date by the user. In other words, a user may save a custom configuration so that they may recall that same configuration later on in the session, or in future sessions. In some embodiments, a preset may be saved as a default preset which gets recalled automatically upon the user connecting to a session. In some embodiments, the system may present one or more UI components configured to load a preset configuration of canvas assets to be presented within the canvas section, and/or a preset configuration of selector components to be presented within the asset selector section. Thus, the UI may present UI components which allow the user to load a preset configuration. The canvas section would then reconfigure based on the preset in real time.

In some embodiments, one or more triggering conditions may be identified by the system which cause the system to dynamically change the UI in some way. In some embodiments, the triggering conditions may be identified via rule-based determination, ML-assisted pattern observation, or other such techniques. In one example, if a fire alarm is heard within a video stream of the participant, the participant may see a change to the UI with a prominent warning to follow fire safety procedures to evacuate the building. This warning may appear as a canvas asset and the other canvas assets may be recomposited to provide the new asset with space. In another example, if motion is detected within a video stream, then the system may move the canvas asset for the video stream to a prominent place (such as the top center of the canvas section) to indicate that there is activity within that video stream. In another example, if the CEO of a participant's company shares some content, and the hierarchy of the company is identified by the system via retrievable account metadata, the participant may automatically be provided with a canvas asset within the canvas section showing the CEO's content. Thus, in some instances, content may be overridden or new canvas assets may be added based on the triggering conditions present.

In some embodiments, the system determines a spatial audio configuration for the chosen selector component and the one or more canvas assets in the canvas section based on the positioning of the chosen selector component and the one or more canvas assets. Upon the canvas section being configured or reconfigured, with one or more canvas assets being placed in various positions in the canvas section, the system may assign certain spatial audio positions for audio sourced from canvas assets. For example, a video feed placed on the left side of the canvas section may be assigned to a corresponding left stereo space for the outgoing audio. Similarly, a video positioned in the top left may be heard as if it is coming from the top left within the headspace of a user wearing headphones. Other similar audio positioning configurations may be contemplated.

In some embodiments, at least a subset of the canvas assets in the canvas section contain composite video streams with a number of layers. That is, they may contain, for example, a background layer, a layer for the participant, and a layer for annotations. In some embodiments, the system may present, to a user at the client device, one or more user interface components configured to remove one or more of the layers of one of the composite video streams. Thus, a participant may remove, for example, the annotation layer from one of the streams, then place it within the canvas section. This may be due to a preference on the part of the user for not wanting to see any feeds with annotations applied, or some other suitable reason.

In various embodiments, a user may manipulate various canvas assets that have been placed in the canvas section in order to resize, reposition, or recomposite them. For example, clicking and dragging on the border of a canvas asset may allow the user to resize the asset. In some embodiments, other canvas assets may automatically be recomposited in real time as the canvas asset is in the process of being resized. Similarly, a user may be able to click and drag a canvas asset to reposition the asset. Other assets may automatically be recomposited in real time as the asset is being repositioned.

In some embodiments, the system presents, at the client device, one or more user interface components configured to toggle a lock for one or more canvas assets in the canvas section such that while a lock is toggled for a canvas asset, the locked canvas asset is configured to not be recomposited, removed, or otherwise adjusted within the canvas section. In some embodiments, when the lock is toggled on, the user may not be able to add, remove, or reposition any components of the canvas section. In some embodiments, a middle state or alternate lock state may be toggled wherein a canvas asset may be placed into an empty area within a locked canvas section, but other components will not be recomposited in relation to that newly placed asset. In this state, the user may lock the current layout, then place new canvas assets into the canvas section without changing the layout itself.

FIG. 3A is a diagram illustrating one example embodiment of a layout for a dynamically user-configurable interface for a communication session, according to some embodiments.

In the illustrated example, a user interface 310 is shown, consisting of a general canvas section 312 and an asset selector section 314. The asset selector section 314 may be a panel or sidebar section within the UI. The canvas section 312 may take up a large portion of the overall UI, and is the region where various canvas assets are placed for the communication session. In some embodiments, the asset selector section 314 and/or canvas section 312 may be resized by the user, or repositioned. For example, the asset selector section may be repositioned so that it is placed to the left or right of, or above or below, the general canvas section 312.

Figure 3B:
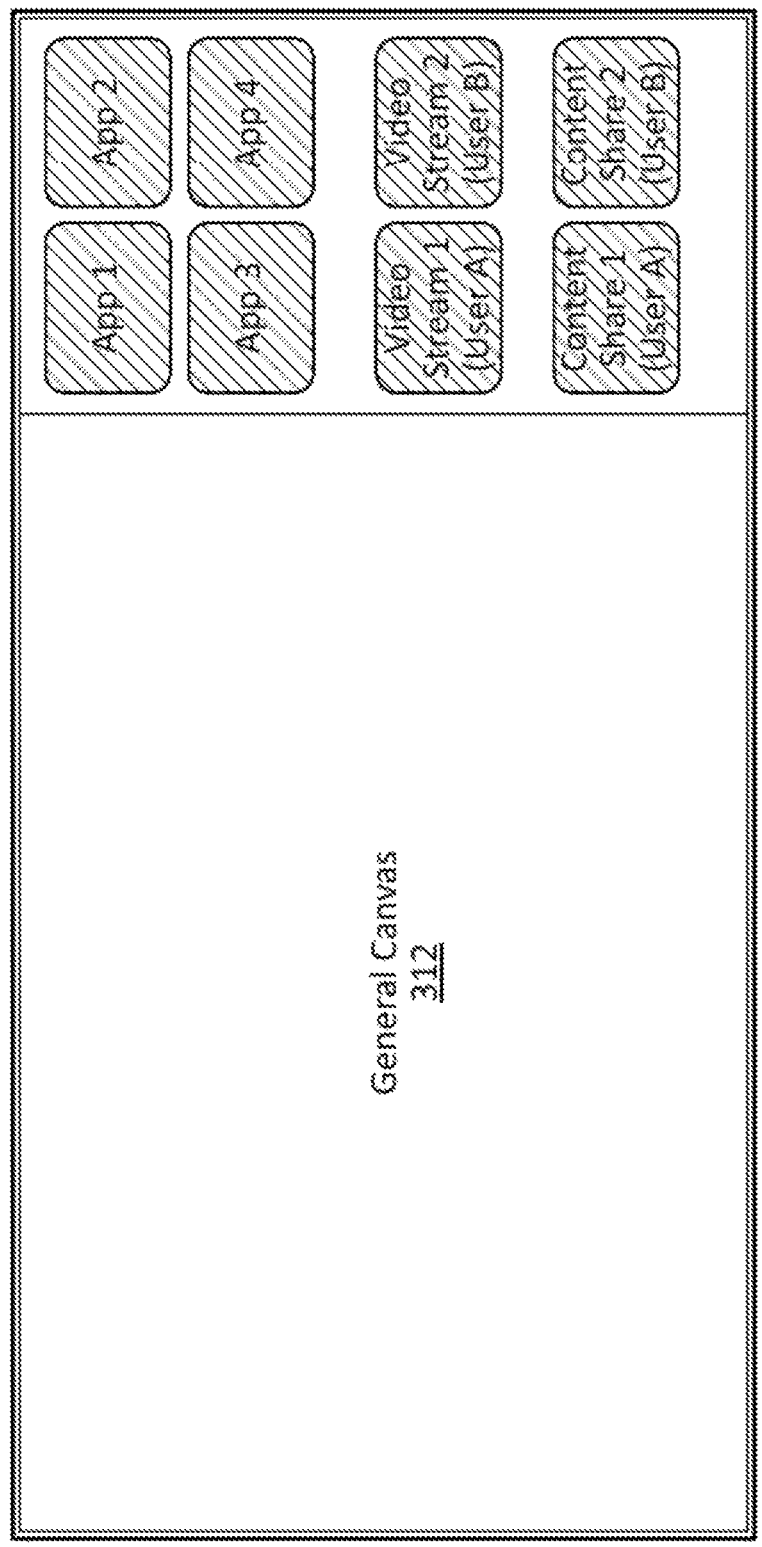
FIG. 3B is a diagram illustrating one example embodiment of an asset selector section of a UI with a number of selector components, according to some embodiments.

FIG. 3B is a diagram illustrating one example embodiment of an asset selector section of a UI with a number of selector components, according to some embodiments.

In the illustrated example, the asset selector section 314 is shown as a sidebar or side panel with a number of selector components placed within it. The selector components for a user to select from include four applications (App 1-4), two video streams (Video Stream 1 for User A, Video Stream 2 for User B), and two content share components (Content Share 1 for User A, Content Share 2 for User B). A user may be able to interactively select one or more of the components, and place them within the general canvas section to the left of the asset selector 314.

Figure 4A:
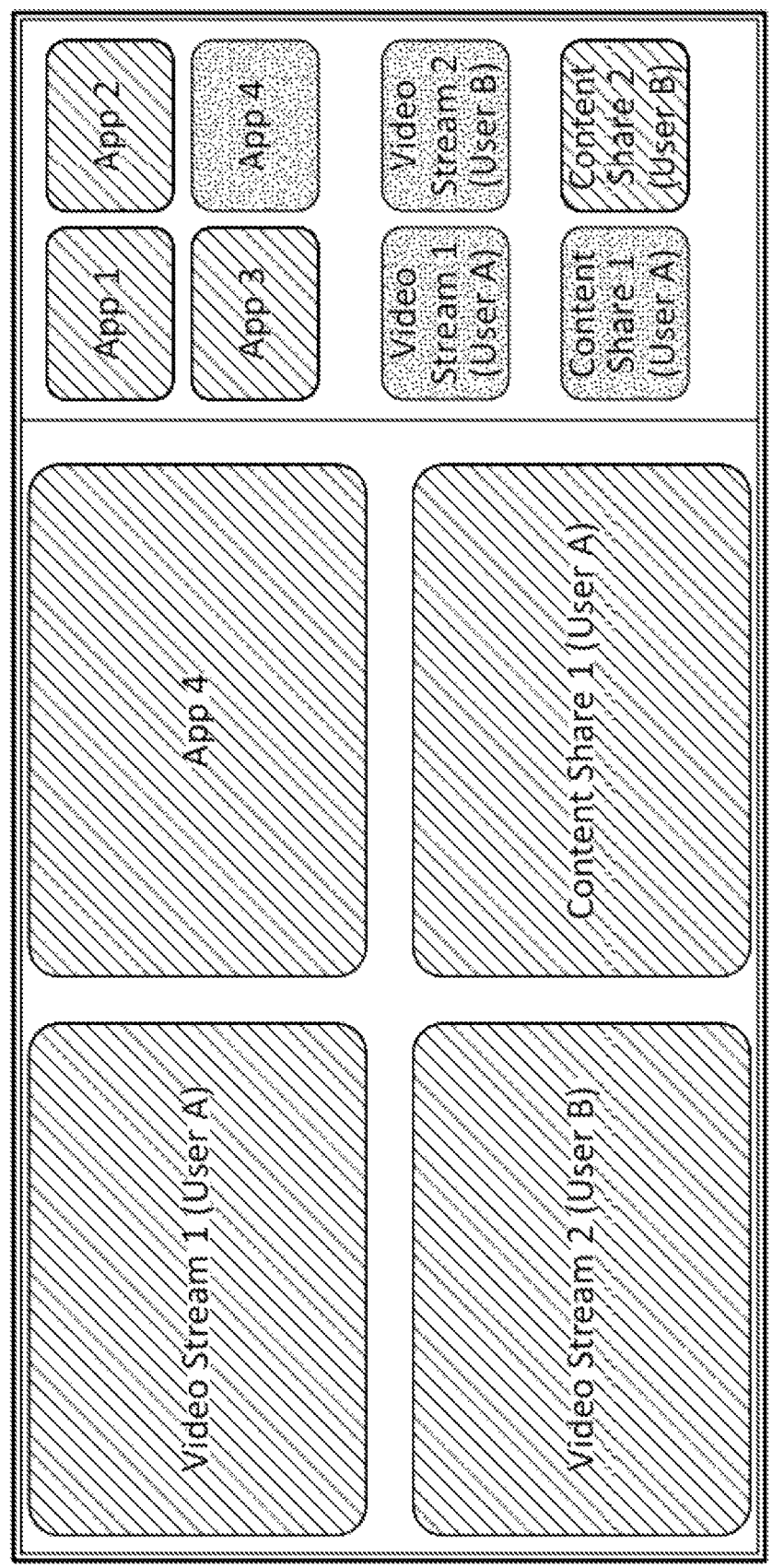
FIG. 4A is a diagram illustrating one example embodiment of a canvas layout for a UI, according to some embodiments.

FIG. 4A is a diagram illustrating one example embodiment of a canvas layout for a UI, according to some embodiments.

In the illustrated example, the user has selected various selector components to be placed within the canvas section, particularly App 4, Video Stream 1, Video Stream 2, and Content Share 1. The system has automatically recomposited the canvas assets as each new asset is placed in the canvas section. The end result is four equally spaced canvas assets in the top left, top right, bottom left, and bottom right, each of equal size. In the asset selector section on the right, the chosen selector components are visually different from the components which have not been chosen, to indicate that they are currently placed in the canvas section.

Figure 4B:
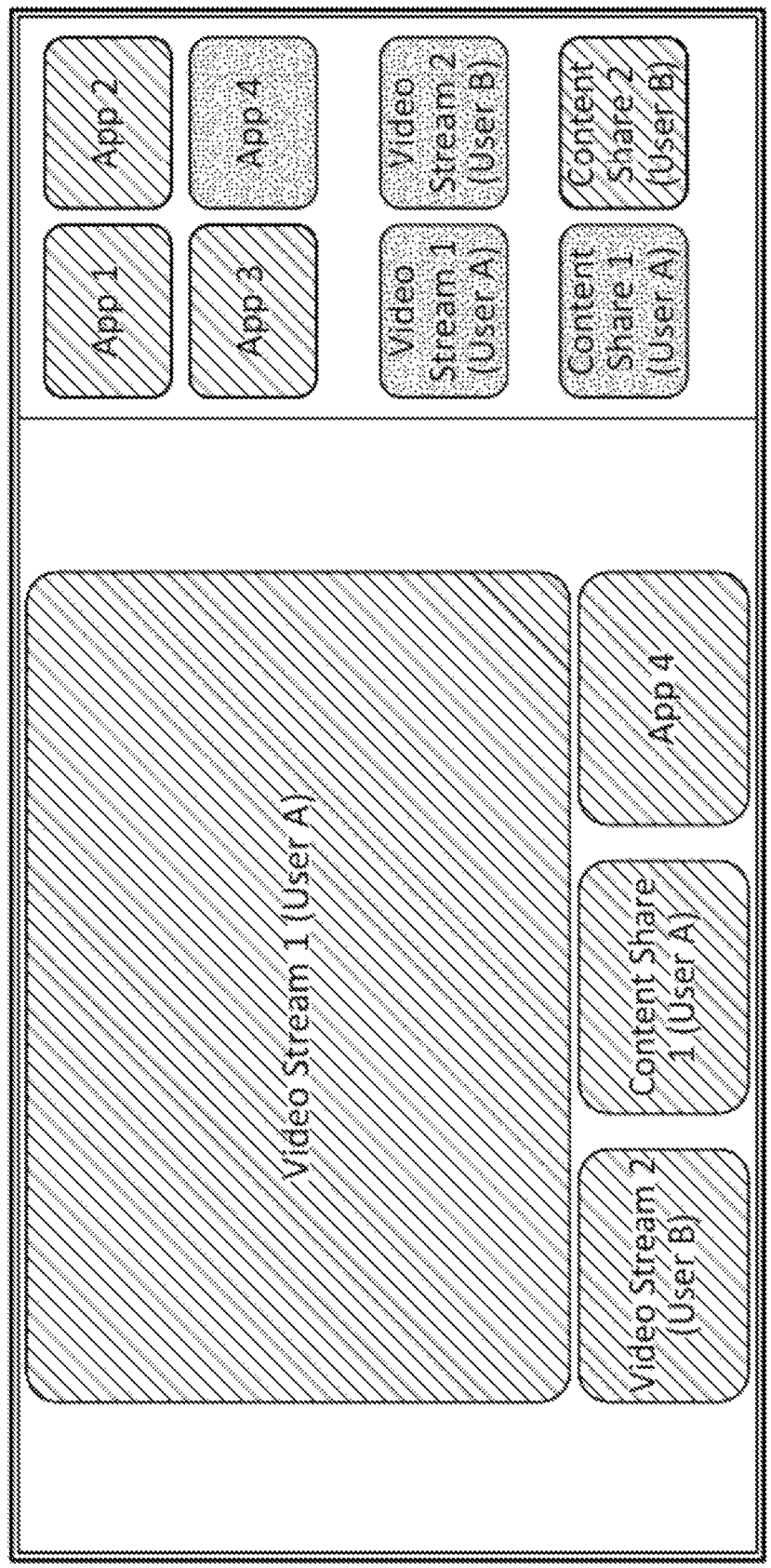
FIG. 4B is a diagram illustrating one example embodiment of a canvas layout for a UI, according to some embodiments.

FIG. 4B is a diagram illustrating one example embodiment of a canvas layout for a UI, according to some embodiments.

In the illustrated example, the user has selected various selector components to be placed within the canvas section, particularly App 4, Video Stream 1, Video Stream 2, and Content Share 1. The system has automatically recomposited the canvas assets as each new asset is placed in the canvas section. In this example, the user may have indicated or interactively selected for the Video Stream 1 to have a larger size than the other components, or alternatively, the system may have automatically selected a larger size for the Video Stream 1. For example, Video Stream 1 may represent a video stream for the active speaker within the session, and thus may be presented more prominently by default. The end result is that the Video Stream 1 asset takes up a large portion of the canvas section, with the three remaining assets each taking up a small portion of the canvas section along the bottom.

Figure 4C:
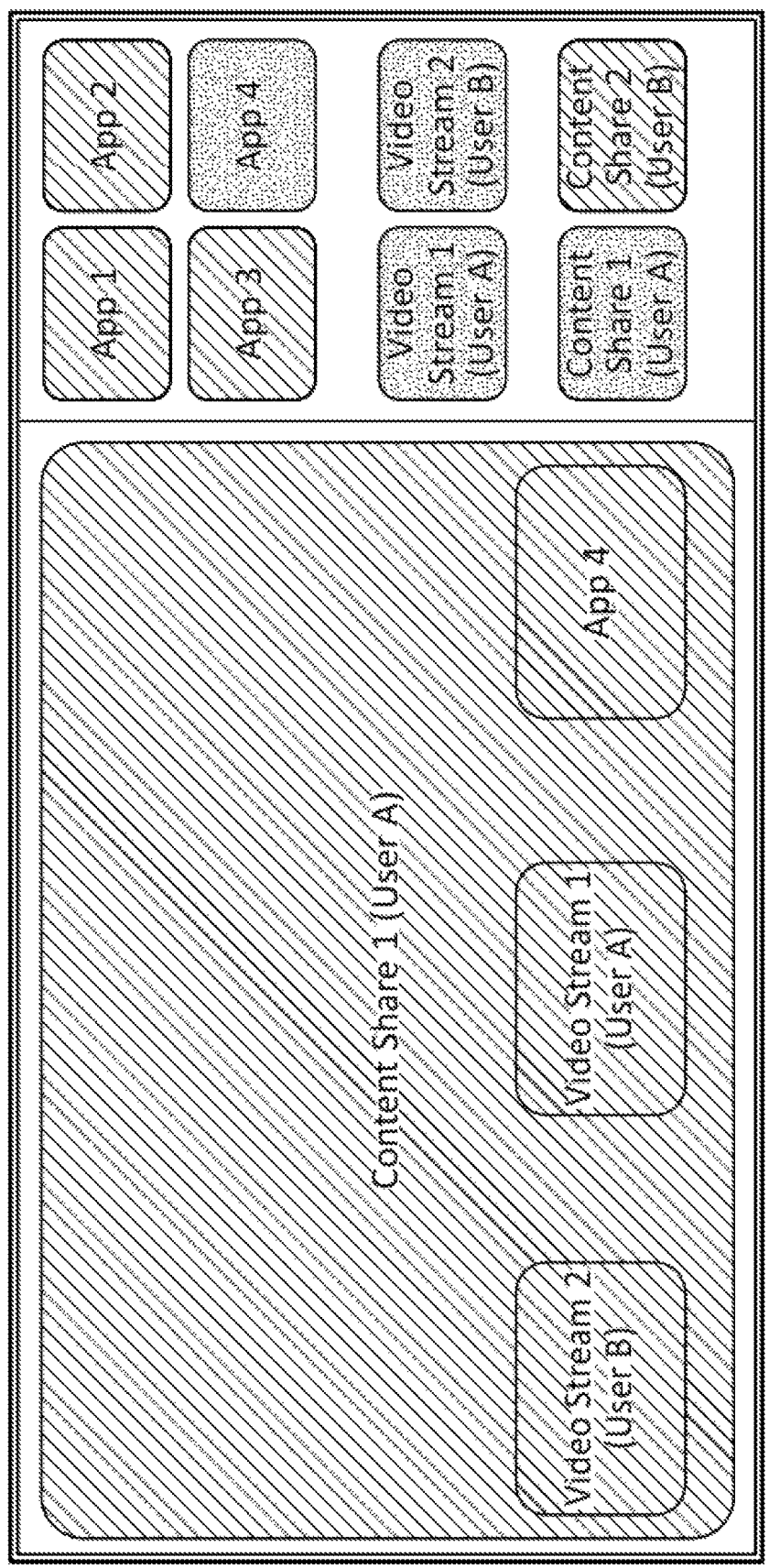
FIG. 4C is a diagram illustrating one example embodiment of a canvas layout for a UI, according to some embodiments.

FIG. 4C is a diagram illustrating one example embodiment of a canvas layout for a UI, according to some embodiments.

In the illustrated example, the user has selected various selector components to be placed within the canvas section, particularly App 4, Video Stream 1, Video Stream 2, and Content Share 1. The system has automatically recomposited the canvas assets as each new asset is placed in the canvas section. In this example, the user may have indicated or interactively selected for the Content Share 1 to be placed in the full area of the canvas section with the other assets overlaid on top of Content Share 1 along the bottom, or alternatively, the system may have automatically selected such a configuration based on the components. For example, Video Stream 1 may represent a content share which requires a large amount of space to be seen legibly on the display of the client device which the user is using, and thus may be presented more prominently by default. The system may also determine that no content along the bottom would be blocked from viewing by the three components being overlaid in that region.

Figure 4D:
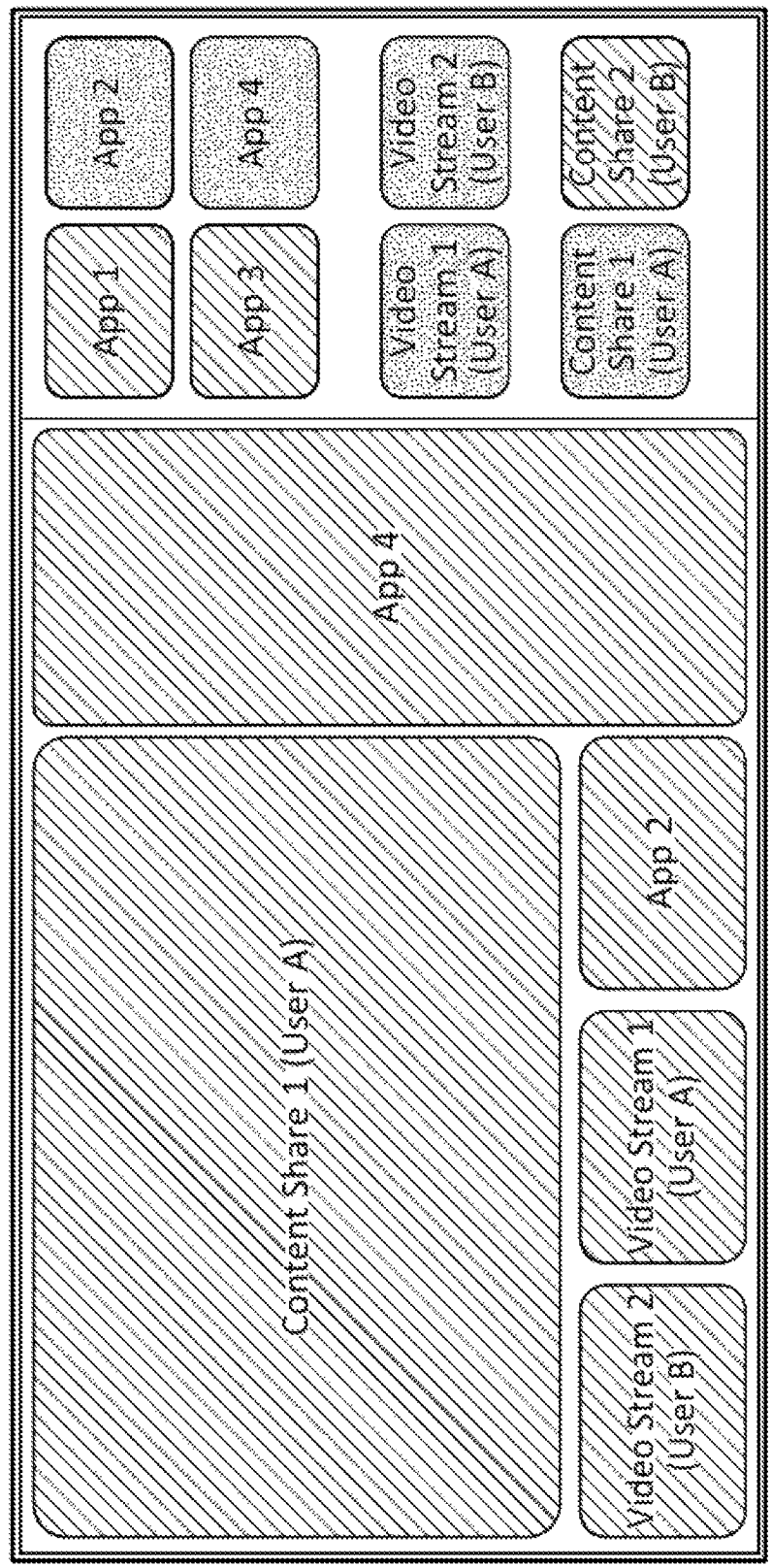
FIG. 4D is a diagram illustrating one example embodiment of a canvas layout for a UI, according to some embodiments.

FIG. 4D is a diagram illustrating one example embodiment of a canvas layout for a UI, according to some embodiments. In the illustrated example, the user has selected various selector components to be placed within the canvas section, particularly App 2, App 4, Video Stream 1, Video Stream 2, and Content Share 1. The system has automatically recomposited the canvas assets as each new asset is placed in the canvas section. In this example, the user may have indicated or interactively selected for the Content Share 1 asset to have a larger size than the other components and the App 4 asset to have more apportioned vertical space, or alternatively, the system may have automatically selected such a configuration based on the types of canvas assets selected and/or other information. For example, App 4 may be a note-taking application which is oriented such that the user can use it most easily with a large amount of vertical space. The system may be configured to automatically apportion such vertical space for that type of application. Similarly, the content share may have small text which can only be legibly seen at a certain minimum size on the display of the client device being used, and the system may thus apportion such a minimum size automatically for that asset.

Figure 5:
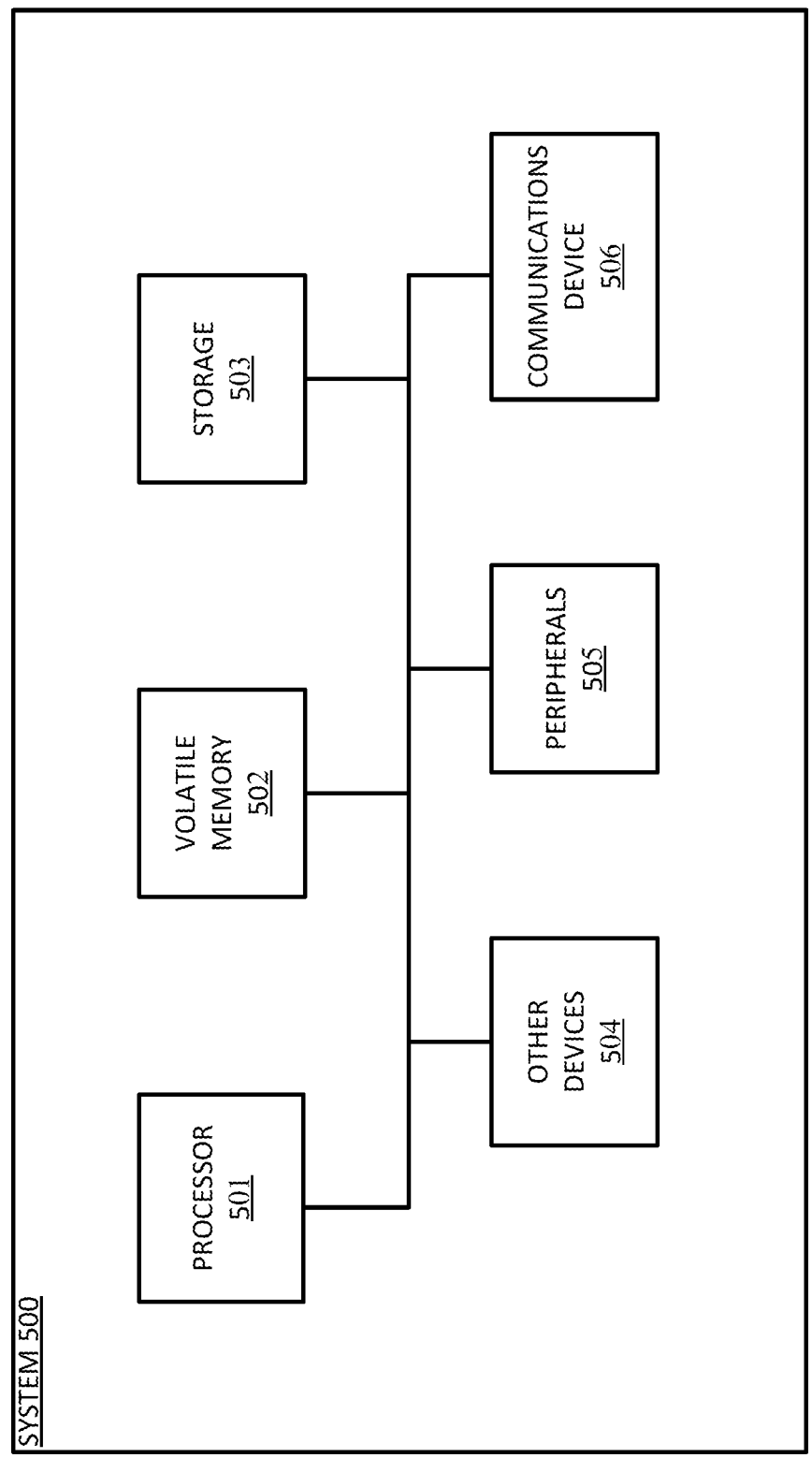
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method, comprising: presenting, at a client device connected to a communication session, a user interface (UI), the UI comprising: a canvas section comprising one or more canvas assets, and an asset selector section comprising one or more selector components representing canvas assets; receiving a request to place a chosen selector component from the asset selector section into a specified location in the canvas section, the chosen selector component of the selector component being not yet presented in the canvas section; and in response to the request: identifying a type and one or more size properties of the canvas assets in the canvas section and one or more size properties of the canvas section; determining a size for the chosen selector component based on the size properties of the canvas assets in the canvas section and the size property of the canvas section; and presenting, at the client device in substantially real time upon receiving the request, the chosen selector component within the specified location in the canvas section at the determined size while concurrently recompositing the canvas assets in the canvas section.

Example 2. The method of example 1, wherein the one or more canvas assets comprise one or more video stream components, content share components, application components, or any combination thereof.

Example 3. The method of any of examples 1-2, wherein: the one or more size properties of the canvas assets and the one or more size properties of the canvas section comprise print resolutions, determining the size for the chosen selector component comprises determining a print resolution for the chosen selector component, the chosen selector component being presented at the determined print resolution, and concurrently recompositing the canvas assets in the canvas section comprises determining new print resolutions for the canvas assets and adjusting the canvas assets to the new print resolutions.

Example 4. The method of any of examples 1-3, further comprising: presenting, at the client device, a notification that the chosen selector component cannot be placed at the specified location or that the content of the chosen selector component cannot be displayed at a minimum threshold of legibility.

Example 5. The method of any of examples 1-4, wherein at least one of the canvas assets in the canvas section is replaced with the chosen selector component.

Example 6. The method of any of examples 1-5, wherein the one or more canvas assets within the canvas section and the one or more selector components within the asset selector section are determined based on a pre-specified default configuration.

Example 7. The method of any of examples 1-6, wherein the one or more canvas assets within the canvas section and the one or more selector components within the asset selector section are determined using an artificial intelligence (AI) model trained on at least one of: historical preferences of a user associated with the client device, past behavior of the user with respect to canvas assets or selector components of the same component type, and past behavior of other users with respect to canvas assets or selector components of the same component type.

Example 8. The method of any of examples 1-7, wherein size properties for the canvas assets in the canvas section and the chosen selector component are determined according to one or more grid-based recompositing options to be applied to the canvas section.

Example 9. The method of any of examples 1-8, further comprising: presenting, to a user at the client device, one or more user interface components configured to save the canvas configuration to a custom preset configuration that is retrievable at a later date by the user.

Example 10. The method of any of examples 1-9, further comprising: determining a spatial audio configuration for the chosen selector component and the one or more canvas assets in the canvas section based on the positioning of the chosen selector component and the one or more canvas assets.

Example 11. The method of any of examples 1-10, wherein at least a subset of the one or more canvas assets in the canvas section comprise composite video streams with a plurality of layers, the method further comprising: presenting, to a user at the client device, one or more user interface components configured to remove one or more of the layers of one of the composite video streams.

Example 12. The method of any of examples 1-11, wherein concurrently recompositing the one or more canvas assets is further based on one or more of: identified component types of each of the canvas assets, one or more active or recently active speakers associated with canvas assets, and one or more active content shares associated with canvas assets.

Example 13. The method of any of examples 1-12, wherein the request further comprises one or more additional chosen selector components, the chosen selector component and the additional chosen selector components being presented as composited layers within the single chosen selector component.

Example 14. The method of any of examples 1-13, wherein the request further comprises one or more chosen canvas assets from the one or more canvas assets in the canvas section, the chosen selector component and the chosen canvas assets being presented as composited layers within the single chosen selector component.

Example 15. The method of any of examples 1-14, wherein recompositing the canvas assets in the canvas section comprises: receiving information about the borders of the content within each of the canvas assets, and cropping each of the canvas assets up to the borders of the content so that the content is still visible within the UI.

Example 16. The method of any of examples 1-15, wherein recompositing the canvas assets in the canvas section comprises grouping one or more of the canvas assets into a single grouped canvas asset comprising a plurality of canvas assets.

Example 17. The method of any of examples 1-16, further comprising: presenting, at the client device, one or more user interface components configured to toggle a lock for one or more canvas assets in the canvas section such that while a lock is toggled for a canvas asset, the locked canvas asset is configured to not be recomposited, removed, or otherwise adjusted within the canvas section.

Example 18. The method of any of examples 1-17, further comprising: presenting, at the client device, one or more user interface components configured to load one or more of: a preset configuration of canvas assets to be presented within the canvas section and a preset configuration of selector components to be presented within the asset selector section.

Example 19. A communication system comprising one or more processors configured to perform the operations of: presenting, at a client device connected to a communication session, a user interface (UI), the UI comprising: a canvas section comprising one or more canvas assets, and an asset selector section comprising one or more selector components representing canvas assets; receiving a request to place a chosen selector component from the asset selector section into a specified location in the canvas section, the chosen selector component being not yet presented in the canvas section; and in response to the request: identifying one or more size properties of the canvas assets in the canvas section and one or more size properties of the canvas section; determining a size for the chosen selector component based on the size properties of the canvas assets in the canvas section and the size property of the canvas section; and presenting, at the client device in substantially real time upon receiving the request, the chosen selector component within the specified location in the canvas section at the determined size while concurrently recompositing the canvas assets in the canvas section.

Example 20. The communication system of example 19, wherein the one or more canvas assets comprise one or more video stream components, content share components, application components, or any combination thereof.

Example 21. The communication system of any of examples 19-20, wherein: the one or more size properties of the canvas assets and the one or more size properties of the canvas section comprise print resolutions, determining the size for the chosen selector component comprises determining a print resolution for the chosen selector component, the chosen selector component being presented at the determined print resolution, and concurrently recompositing the canvas assets in the canvas section comprises determining new print resolutions for the canvas assets and adjusting the canvas assets to the new print resolutions.

Example 22. The communication system of any of examples 19-21, wherein the one or more processors are further configured to perform the operation of: presenting, at the client device, a notification that the chosen selector component cannot be placed at the specified location or that the content of the chosen selector component cannot be displayed at a minimum threshold of legibility.

Example 23. The communication system of any of examples 19-22, wherein at least one of the canvas assets in the canvas section is replaced with the chosen selector component.

Example 24. The communication system of any of examples 19-23, wherein the one or more canvas assets within the canvas section and the one or more selector components within the asset selector section are determined based on a pre-specified default configuration.

Example 25. The communication system of any of examples 19-24, wherein the one or more canvas assets within the canvas section and the one or more selector components within the asset selector section are determined using an artificial intelligence (AI) model trained on at least one of: historical preferences of a user associated with the client device, past behavior of the user with respect to canvas assets or selector components of the same component type, and past behavior of other users with respect to canvas assets or selector components of the same component type.

Example 26. The communication system of any of examples 19-25, wherein size properties for the canvas assets in the canvas section and the chosen selector component are determined according to one or more grid-based recompositing options to be applied to the canvas section.

Example 27. The communication system of any of examples 19-26, wherein the one or more processors are further configured to perform the operation of: presenting, to a user at the client device, one or more user interface components configured to save the canvas configuration to a custom preset configuration that is retrievable at a later date by the user.

Example 28. The communication system of any of examples 19-27, wherein the one or more processors are further configured to perform the operation of: determining a spatial audio configuration for the chosen selector component and the one or more canvas assets in the canvas section based on the positioning of the chosen selector component and the one or more canvas assets.

Example 29. The communication system of any of examples 19-28, wherein at least a subset of the one or more canvas assets in the canvas section comprise composite video streams with a plurality of layers, the communication system further comprising: presenting, to a user at the client device, one or more user interface components configured to remove one or more of the layers of one of the composite video streams.

Example 30. The communication system of any of examples 19-29, wherein concurrently recompositing the one or more canvas assets is further based on one or more of: identified component types of each of the canvas assets, one or more active or recently active speakers associated with canvas assets, and one or more active content shares associated with canvas assets.

Example 31. The communication system of any of examples 19-30, wherein the request further comprises one or more additional chosen selector components, the chosen selector component and the additional chosen selector components being presented as composited layers within the single chosen selector component.

Example 32. The communication system of any of examples 19-31, wherein the request further comprises one or more chosen canvas assets from the one or more canvas assets in the canvas section, the chosen selector component and the chosen canvas assets being presented as composited layers within the single chosen selector component.

Example 33. The communication system of any of examples 19-32, wherein recompositing the canvas assets in the canvas section comprises: receiving information about the borders of the content within each of the canvas assets, and cropping each of the canvas assets up to the borders of the content so that the content is still visible within the UI.

Example 34. The communication system of any of examples 19-33, wherein recompositing the canvas assets in the canvas section comprises grouping one or more of the canvas assets into a single grouped canvas asset comprising a plurality of canvas assets.

Example 35. The communication system of any of examples 19-34, wherein the one or more processors are further configured to perform the operation of: presenting, at the client device, one or more user interface components configured to toggle a lock for one or more canvas assets in the canvas section such that while a lock is toggled for a canvas asset, the locked canvas asset is configured to not be recomposited, removed, or otherwise adjusted within the canvas section.

Example 36. The communication system of any of examples 19-35, wherein the one or more processors are further configured to perform the operation of: presenting, at the client device, one or more user interface components configured to load one or more of: a preset configuration of canvas assets to be presented within the canvas section and a preset configuration of selector components to be presented within the asset selector section.

Example 37. A non-transitory computer-readable medium containing instructions for generating a note with session content from a communication session, comprising: instructions for presenting, at a client device connected to a communication session, a user interface (UI), the UI comprising: a canvas section comprising one or more canvas assets, and an asset selector section comprising one or more selector components representing canvas assets; instructions for receiving a request to place a chosen selector component from the asset selector section into a specified location in the canvas section, the chosen selector component being not yet presented in the canvas section; and in response to the request, instructions for identifying one or more size properties of the canvas assets in the canvas section and one or more size properties of the canvas section; determining a size for the chosen selector component based on the size properties of the canvas assets in the canvas section and the size property of the canvas section; and presenting, at the client device in substantially real time upon receiving the request, the chosen selector component within the specified location in the canvas section at the determined size while concurrently recompositing the canvas assets in the canvas section.

Example 38. The non-transitory computer-readable medium of example 37, wherein the one or more canvas assets comprise one or more video stream components, content share components, application components, or any combination thereof.

Example 39. The non-transitory computer-readable medium of any of examples 37-38, wherein: the one or more size properties of the canvas assets and the one or more size properties of the canvas section comprise print resolutions, determining the size for the chosen selector component comprises determining a print resolution for the chosen selector component, the chosen selector component being presented at the determined print resolution, and concurrently recompositing the canvas assets in the canvas section comprises determining new print resolutions for the canvas assets and adjusting the canvas assets to the new print resolutions.

Example 40. The non-transitory computer-readable medium of any of examples 37-39, further comprising: presenting, at the client device, a notification that the chosen selector component cannot be placed at the specified location or that the content of the chosen selector component cannot be displayed at a minimum threshold of legibility.

Example 41. The non-transitory computer-readable medium of any of examples 37-40, wherein at least one of the canvas assets in the canvas section is replaced with the chosen selector component.

Example 42. The non-transitory computer-readable medium of any of examples 37-41, wherein the one or more canvas assets within the canvas section and the one or more selector components within the asset selector section are determined based on a pre-specified default configuration.

Example 43. The non-transitory computer-readable medium of any of examples 37-42, wherein the one or more canvas assets within the canvas section and the one or more selector components within the asset selector section are determined using an artificial intelligence (AI) model trained on at least one of: historical preferences of a user associated with the client device, past behavior of the user with respect to canvas assets or selector components of the same component type, and past behavior of other users with respect to canvas assets or selector components of the same component type.

Example 44. The non-transitory computer-readable medium of any of examples 37-43, wherein size properties for the canvas assets in the canvas section and the chosen selector component are determined according to one or more grid-based recompositing options to be applied to the canvas section.

Example 45. The non-transitory computer-readable medium of any of examples 37-44, further comprising: presenting, to a user at the client device, one or more user interface components configured to save the canvas configuration to a custom preset configuration that is retrievable at a later date by the user.

Example 46. The non-transitory computer-readable medium of any of examples 37-45, further comprising: determining a spatial audio configuration for the chosen selector component and the one or more canvas assets in the canvas section based on the positioning of the chosen selector component and the one or more canvas assets.

Example 47. The non-transitory computer-readable medium of any of examples 37-46, wherein at least a subset of the one or more canvas assets in the canvas section comprise composite video streams with a plurality of layers, the non-transitory computer-readable medium further comprising: presenting, to a user at the client device, one or more user interface components configured to remove one or more of the layers of one of the composite video streams.

Example 48. The non-transitory computer-readable medium of any of examples 37-47, wherein concurrently recompositing the one or more canvas assets is further based on one or more of: identified component types of each of the canvas assets, one or more active or recently active speakers associated with canvas assets, and one or more active content shares associated with canvas assets.

Example 49. The non-transitory computer-readable medium of any of examples 37-48, wherein the request further comprises one or more additional chosen selector components, the chosen selector component and the additional chosen selector components being presented as composited layers within the single chosen selector component.

Example 50. The non-transitory computer-readable medium of any of examples 37-49, wherein the request further comprises one or more chosen canvas assets from the one or more canvas assets in the canvas section, the chosen selector component and the chosen canvas assets being presented as composited layers within the single chosen selector component.

Example 51. The non-transitory computer-readable medium of example 15, wherein recompositing the canvas assets in the canvas section comprises: receiving information about the borders of the content within each of the canvas assets, and cropping each of the canvas assets up to the borders of the content so that the content is still visible within the UI.

Example 52. The non-transitory computer-readable medium of example 15, wherein recompositing the canvas assets in the canvas section comprises grouping one or more of the canvas assets into a single grouped canvas asset comprising a plurality of canvas assets.

Example 53. The non-transitory computer-readable medium of example 15, further comprising: presenting, at the client device, one or more user interface components configured to toggle a lock for one or more canvas assets in the canvas section such that while a lock is toggled for a canvas asset, the locked canvas asset is configured to not be recomposited, removed, or otherwise adjusted within the canvas section.

Example 54. The non-transitory computer-readable medium of example 15, further comprising: presenting, at the client device, one or more user interface components configured to load one or more of: a preset configuration of canvas assets to be presented within the canvas section and a preset configuration of selector components to be presented within the asset selector section.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
presenting, at a client device connected to a communication session, a user-configurable user interface (UI) within a communication platform that facilitates the communication session, wherein the user-configurable UI is dynamically adjustable during the communication session to display canvas assets in user-specified locations at user-specified sizes, wherein the canvas assets include live streamed video content, a slide presentation, a content share, a pre-recorded video playback, and a local application, the UI comprising:
   a canvas section comprising one or more canvas assets, wherein each canvas asset is a UI component of the user-configurable UI for the communication session, and
   an asset selector section comprising one or more selector components representing canvas assets;
receiving a request to place a chosen selector component from the asset selector section into a specified location in the canvas section, the chosen selector component of the selector component being not yet presented in the canvas section; and
in response to the request:
   identifying a type and one or more size properties of the canvas assets in the canvas section and one or more size properties of the canvas section;
   determining a size for the chosen selector component based on the size properties of the canvas assets in the canvas section and the size property of the canvas section, wherein determining the size for the chosen selector component comprises:
      calculating a minimum print resolution for legibility of the content of the chosen selector component based on content type, user preferences, and device display characteristics; and
      dynamically adjusting the size of the chosen selector component and existing canvas assets in real time such that each asset maintains at least the minimum print resolution for legibility;
   presenting, within the user-configurable UI of the communication platform in substantially real time upon receiving the request, the chosen selector component at the specified location in the canvas section at the determined size when the minimum print resolution for legibility is met while concurrently recompositing the canvas assets in the canvas section; and
   presenting, within the user-configurable UI, a notification that identifies one or more assets that fall below the minimum print resolution for legibility and providing options to remove or replace the one or more identified assets when the minimum print resolution for legibility is not met.

2. The method of claim 1, wherein the one or more canvas assets comprise one or more video stream components, content share components, application components, or any combination thereof.

3. The method of claim 1, wherein concurrently recompositing the canvas assets in the canvas section comprises determining new print resolutions for the canvas assets and adjusting the canvas assets to the new print resolutions.

4. The method of claim 1, further comprising:
presenting, at the client device, a notification that the chosen selector component cannot be placed at the specified location.

5. The method of claim 1, wherein at least one of the canvas assets in the canvas section is replaced with the chosen selector component.

6. The method of claim 1, wherein the one or more canvas assets within the canvas section and the one or more selector components within the asset selector section are determined based on a pre-specified default configuration.

7. The method of claim 1, wherein the one or more canvas assets within the canvas section and the one or more selector components within the asset selector section are determined using an artificial intelligence (AI) model trained on at least one of: historical preferences of a user associated with the client device, past behavior of the user with respect to canvas assets or selector components of a same component type, and past behavior of other users with respect to canvas assets or selector components of the same component type.

8. The method of claim 1, wherein size properties for the canvas assets in the canvas section and the chosen selector component are determined according to one or more grid-based recompositing options to be applied to the canvas section.

9. The method of claim 1, further comprising:
presenting, to a user at the client device, one or more user interface components configured to save a canvas configuration to a custom preset configuration that is retrievable at a later date by the user.

10. The method of claim 1, further comprising:
determining a spatial audio configuration for the chosen selector component and the one or more canvas assets in the canvas section based on a positioning of the chosen selector component and the one or more canvas assets.

11. The method of claim 1, wherein at least a subset of the one or more canvas assets in the canvas section comprise composite video streams with a plurality of layers, the method further comprising:
presenting, to a user at the client device, one or more user interface components configured to remove one or more of the layers of one of the composite video streams.

12. The method of claim 1, wherein concurrently recompositing the one or more canvas assets is further based on one or more of: identified component types of each of the canvas assets, one or more active or recently active speakers associated with canvas assets, and one or more active content shares associated with canvas assets.

13. The method of claim 1, wherein the request further comprises one or more additional chosen selector components, the chosen selector component and the additional chosen selector components being presented as composited layers within a single chosen selector component.

14. The method of claim 1, wherein the request further comprises one or more chosen canvas assets from the one or more canvas assets in the canvas section, the chosen selector component and the chosen canvas assets being presented as composited layers within a single chosen selector component.

15. A communication system comprising:
one or more processors configured to perform operations of:
present, at a client device connected to a communication session, a user-configurable user interface (UI) within a communication platform that facilitates the communication session, wherein the user-configurable UI is dynamically adjustable during the communication session to display canvas assets in user-specified locations at user-specified sizes, wherein the canvas assets include live streamed video content, a slide presentation, a content share, a pre-recorded video playback, and a local application, the UI comprising:
a canvas section comprising one or more canvas assets, wherein each canvas asset is a UI component of the user-configurable UI for the communication session, and
an asset selector section comprising one or more selector components representing canvas assets;
receive a request to place a chosen selector component from the asset selector section into a specified location in the canvas section, the chosen selector component being not yet presented in the canvas section; and
in response to the request:
identify one or more size properties of the canvas assets in the canvas section and one or more size properties of the canvas section;
determine a size for the chosen selector component based on the size properties of the canvas assets in the canvas section and the size property of the canvas section, wherein the size for the chosen selector component is determined based on a calculation of a minimum print resolution for legibility of the content of the chosen selector component based on content type, user preferences, and device display characteristics;
dynamically adjust the size of the chosen selector component and existing canvas assets in real time such that each asset maintains at least the minimum print resolution for legibility;
present, within the user-configurable UI of the communication platform in substantially real time upon receiving the request, the chosen selector component at the specified location in the canvas section at the determined size when the minimum print resolution for legibility is met while concurrently recompositing the canvas assets in the canvas section; and
present, within the user-configurable UI, a notification that identifies one or more assets that fall below the minimum print resolution for legibility and provide options to remove or replace the one or more identified assets when the minimum print resolution for legibility is not met.

16. The communication system of claim 15, wherein the one or more processors are configured to:
receive information about orders of the content within each of the canvas assets, and
crop each of the canvas assets up to borders of the content so that the content is still visible within the UI.

17. The communication system of claim 15, wherein the one or more processors are configured to group one or more of the canvas assets into a single grouped canvas asset comprising a plurality of canvas assets.

18. The communication system of claim 15, wherein the one or more processors are further configured to:
present, at the client device, one or more user interface components configured to toggle a lock for one or more canvas assets in the canvas section such that while a lock is toggled for a canvas asset, the locked canvas asset is configured to not be recomposited, removed, or otherwise adjusted within the canvas section.

19. The communication system of claim 15, wherein the one or more processors are configured to:
present, at the client device, one or more user interface components configured to load one or more of: a preset configuration of canvas assets to be presented within the canvas section and a preset configuration of selector components to be presented within the asset selector section.

20. A non-transitory computer-readable medium containing instructions, that when executed by a processor, cause the processor to perform operations comprising:
presenting, at a client device connected to a communication session, a user-configurable user interface (UI) within a communication platform that facilitates the communication session, wherein the user-configurable UI is dynamically adjustable during the communication session to display canvas assets in user-specified locations at user-specified sizes, wherein the canvas assets include live streamed video content, a slide presentation, a content share, a pre-recorded video playback, and a local application, the UI comprising:
a canvas section comprising one or more canvas assets, wherein each canvas asset is a UI component of the user-configurable UI for the communication session, and
an asset selector section comprising one or more selector components representing canvas assets;
instructions for receiving a request to place a chosen selector component from the asset selector section into a specified location in the canvas section, the chosen selector component being not yet presented in the canvas section; and
in response to the request:
identifying one or more size properties of the canvas assets in the canvas section and one or more size properties of the canvas section;
determining a size for the chosen selector component based on the size properties of the canvas assets in the canvas section and the size property of the canvas section, wherein determining the size for the chosen selector component comprises calculating a minimum print resolution for legibility of the content for of the chosen selector component based on content type, user preferences, and device display characteristics;
dynamically adjusting the size of the chosen selector component and existing canvas assets in real time such that each asset maintains at least the minimum print resolution for legibility;
presenting, within the user-configurable UI of the communication platform in substantially real time upon receiving the request, the chosen selector component at the specified location in the canvas section at the determined size when the minimum print resolution for legibility is met while concurrently recompositing the canvas assets in the canvas section; and
presenting, within the user-configurable UI, a notification that identifies one or more assets that fall below the minimum print resolution for legibility and providing options to remove or replace the one or more identified assets when the minimum print resolution for legibility is not met.

* * * * *